L. HUFFMAN.
KNOB LOCK.
APPLICATION FILED JULY 29, 1918.

1,358,211.

Patented Nov. 9, 1920.
3 SHEETS—SHEET 1.

Inventor
LOUIS HUFFMAN.
By Ralgemond A. Parker
Attorney

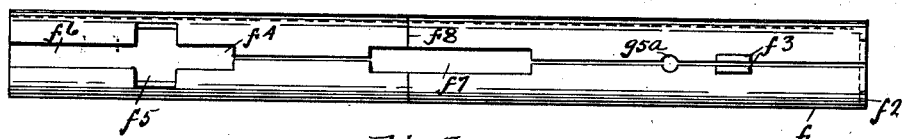
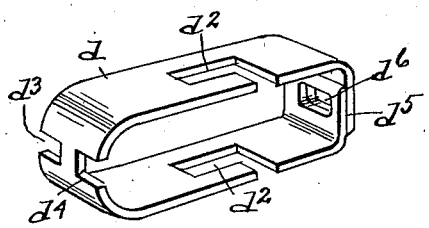
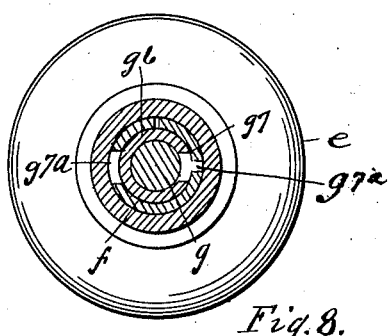
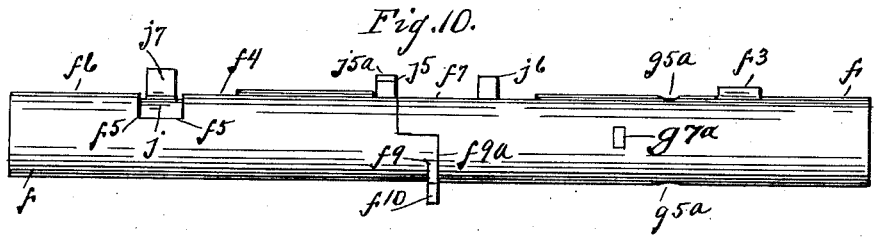
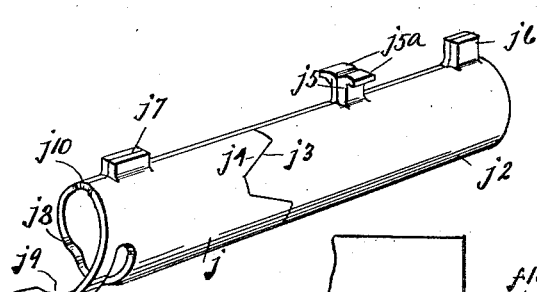
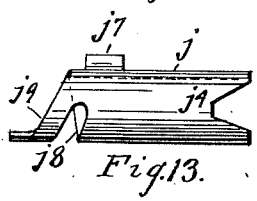
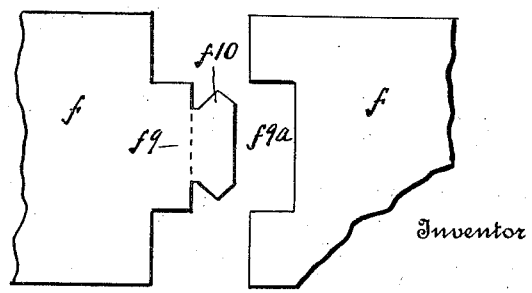

L. HUFFMAN.
KNOB LOCK.
APPLICATION FILED JULY 29, 1918.

1,358,211.

Patented Nov. 9, 1920.
3 SHEETS—SHEET 3.

Inventor
LOUIS HUFFMAN.
By Ralgemond A. Parker
Attorney

UNITED STATES PATENT OFFICE.

LOUIS HUFFMAN, OF TORONTO, ONTARIO, CANADA.

KNOB-LOCK.

1,358,211.   Specification of Letters Patent.   Patented Nov. 9, 1920.

Application filed July 29, 1918. Serial No. 247,154.

*To all whom it may concern:*

Be it known that I, LOUIS HUFFMAN, a subject of the King of Great Britain, residing at Toronto, county of York, Province of Ontario, Canada, have invented a certain new and useful Improvement in Knob-Locks, and declare the following to be a full, clear, and exact description of the same, such as will enable others skilled in the art to which it pertains to make and use the same, reference being had to the accompanying drawings, which form a part of this specification.

My invention relates to locks and an object of my improvements is to provide a lock of the general nature shown in United States Letters Patent #823,348 and #1,086,837 having an improved construction and mode of operation.

I secure this object in the device illustrated in the accompanying drawings in which:

Fig. 7 is a view of the sleeve forming the knob spindle looking from the side which is toward the top of the sheet in Fig. 1.

Fig. 8 is a section on the line 8—8 Fig. 1.

Fig. 9 is a perspective view of the yoke shown in elevation in Figs. 3 and 4.

Fig. 10 is an elevation of the knob spindle shown in Fig. 7 in the position that it occupies in Fig. 1. In this figure lugs are shown projecting from inclosed cylinders or sleeves through slots in the wall of the knob spindle.

Fig. 11 is a detail view illustrating the construction of the knob spindle.

Fig. 12 is a perspective view of two coacting cylinders or sleeves contained within the knob spindle and having lugs projecting through slots in the wall of said cylinder.

Fig. 13 is an elevation of one of the parts shown in Fig. 12.

$a$ is the door adjacent to the knob; $b$ $b$ are the usual escutcheons secured about a circular opening through the door through which the knob spindle extends. $c$ is the bolt or latch having the shank $c^2$ and bearing in a bracket $c^4$ set in the edge of the door as in the usual construction. $c^3$ is a spring surrounding the shank $c^2$ acting against the inner end of the bracket $c^4$ and the head of the bolt $c$ so as to project said bolt from the bracket and cause it to engage the socket in the jam or edge of the doorway. $d$ is a yoke secured by a pin $d^7$ to the inner end of the shank $c^2$. $e$ $e^2$ are the door knobs, each of these is secured and adapted to turn in the adjacent escutcheons $b$. There is an axial opening through each of the knobs $e$ $e^2$ in line with the opening through the door.

Figures 17, 18:
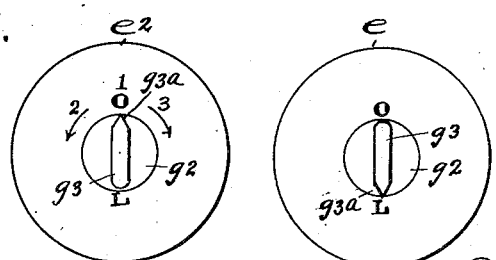
Fig. 17 is a detail elevation looking at the knob $e^2$ from the left of Figs. 1 and 14, the thumb-piece and indicator being in the position that it takes when the parts are located as shown in said figures.
Fig. 18 is a view similar to Fig. 17, the thumb-piece being inverted.

$f$ is a hollow cylindrical spindle or sleeve extending through the opening in the door and into the knobs $e$ and $e^2$ where it is secured in any convenient way as by the conventional screws $i$. $g$ is a rod coaxial with the spindle $f$ extending through the opening in the knob $e^2$ and to a point near the outer end of the shank of the knob $e$. $g^4$ is a ferrule secured by a pin $g^5$ to the inner end of the rod $g$ and having opposite diametral slots $h^2$ in its outer end for the purpose hereinafter described. $g^6$ is a sleeve surrounding the rod $g$ inside of and contiguous with, the ferrule $g^4$. $g^7$ is a pin engaging the sleeve $g^6$ and extending into an aperture $g^{7a}$ in the wall of the spindle $f$ as shown most distinctly in Fig. 8. $g^2$ is a flange integral with or secured upon the outer end of the rod $g$ and engaging against the outer end of the spindle $f$. By the flange $g^2$ engaging against the end of the spindle $f$ and the sleeve $g^6$ engaging against the inner end of the ferrule $g^4$ the rod $g$ is secured in position in the spindle $f$ so that it may be turned about its axis in said spindle but is restrained from relative longitudinal movement. $g^3$ is a thumb-piece extending from the outer end of the rod $g$, this thumb-piece may have one of its edges formed into a pointer $g^{3a}$ as shown in Figs. 17 and 18 and there may be indications upon the knob $e^2$ adjacent to the central opening in which the rod $g$ turns to indicate the direction in which the thumb-piece $g^3$ is to be turned to secure a desired result and an indication $o$ at the top and L at the bottom to indicate the vertical positions of the thumb-piece with the pointer or indicator up or down.

$f^3$ is a lug extending upward from the spindle $f$ and engaging in a slot $e^3$ in the inner wall of the knob $e$.

The yoke $d$ secured to the inner end of the latch or bolt $c$ is provided with bayonet slots $d^2$ at the sides and with the oppositely located slots $d^3$ and $d^4$ (Fig. 9) in its ends. The spindle $f$ is provided with a winged piece or lug $f^{10}$ which engages in the longitudinal portions of the bayonet catches or slots $d^2$ to reciprocate the bolt or catch $c$ in the usual way.

$j^2$ is a cylindrical sleeve fitting within the spindle $f$ and surrounding the rod $g$. The left hand end of the sleeve $j^2$, as shown in the drawings, is formed into cam teeth $j^3$. $j$ is a sleeve similar to $j^2$ surrounding the rod $g$ within the spindle $f$. The right hand end of the sleeve $j$ is provided with cam teeth $j^4$ engaging and coacting with the cam teeth $j^3$ on the sleeve $j^2$. The left hand end of the sleeve $j$ as shown in the figure is shaped to form a cam $j^8$ and there is an extension or lug $j^9$ extending from this end of the sleeve $j$, the edge of which forms a continuation of the cam surface $j^8$. There is a notch or indentation $j^{10}$ in the cam surface $j^8$ for the purpose hereinafter described. $g^8$ is a cylindrical lug extending from the outer wall of the rod $g$ and engaging against the cam surface $j^8$. $k$ is a compression spring, one end of which rests against the sleeve $g^6$ and the other against the end of the sleeve $j^2$. Thus the sleeve $j^2$ is pressed against the sleeve $j$ and this latter is pressed against the lug $g^8$.

$f^7$ is a longitudinal slot through the wall of the spindle $f$ at the center thereof and extending laterally beyond the yoke $d$ at each end. $j^5$ is a lug extending upward from the sleeve $j^2$ through the slot $f^7$ upon one side of the yoke $d$ and $j^6$ is a lug extending from said sleeve through said slot upon the other side of the yoke $d$. The lug $j^5$ has its outer end enlarged as shown in Fig. 12. The lug $j^5$ is adapted to engage in the slot $d^3$ in the yoke $d$ and the lug $j^6$ is adapted to engage in the slot $d^4$ in said yoke.

$f^4$ $f^6$ are parts of a slot through the walls of the spindle $f$ extending longitudinally of said spindle, and $f^5$ is an intermediate portion of said slot extending laterally to form an enlargement of the slot upon both sides. $j^7$ is a lug extending from the sleeve $j$ through the slot $f^4$ $f^5$ $f^6$ and engaging in a slot $e^4$ in the inner wall of the knob $e^2$. The slot $e^4$ permits the sleeve $j$ to move longitudinally relative to the knob $e^2$ but restrains relative angular motion.

Figure 1:
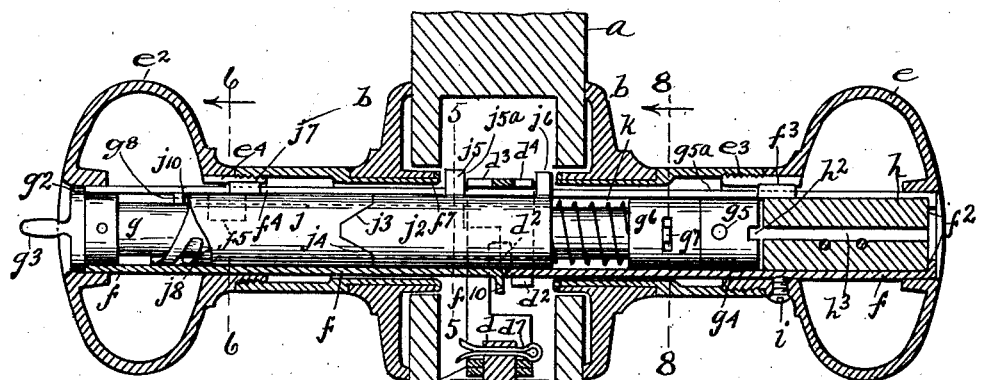
Figure 1 is a cross section of an apparatus embodying my invention.
Figure 14:
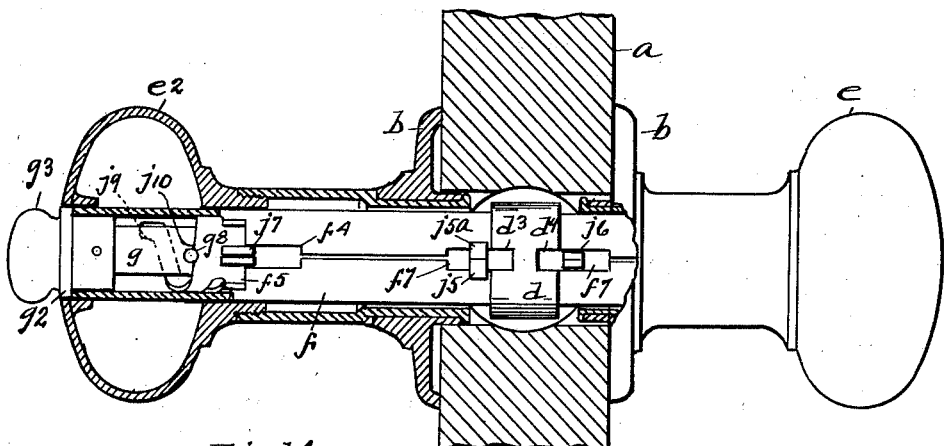
Fig. 14 is a view similar to Fig. 1, the section being taken at right angles to that of Fig. 1 and looking from above said figure.

The operation of the above described apparatus is as follows:

The rod $g$ is turned by the thumb-piece $g^3$ to the position indicated in Figs. 1, 14 and 17. In this position the lug $g^8$ extending from the rod $g$ engages in the notch $j^{10}$ in the cam $j^8$, being held firmly therein by the action of the spring $k$. The lugs $j^5$ and $j^6$ extending from the sleeve $j^2$ are at their respective sides of the yoke $d$ and do not engage said yoke. The lug $j^7$ extending from the sleeve $j$ engages in the part $f^4$ of the slot $f^4$ $f^5$ $f^6$ through the wall of the spindle $f$. In this position the spindle may be turned by manipulating either of the knobs and the bolt $c$ will be retracted or released by the turning of the spindle in the usual way.

Figure 15:
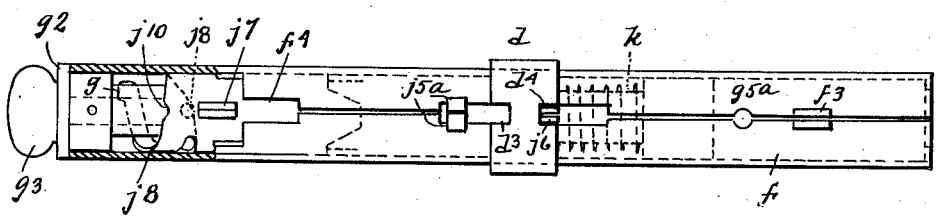
Fig. 15 is a view of the knob spindle and yoke, the parts being in a different position from that shown in Figs. 1 and 14.

If the rod $g$ is turned to the left to the position shown in Fig. 18, the lug $g^8$ will move along the cam $j^8$ permitting the sleeves $j$ and $j^2$ to move toward the left, as shown in the figures, under the influence of the pressure of the spring $k$. This will engage the lug $j^6$ in the slot $d^4$ in the yoke $d$ as shown in Fig. 15, and the lug $j^7$ will be in the enlargement $f^5$ of the slot $f^4$ $f^5$ $f^6$. In this position the knob $e$ will be locked by the engagement of the lug $j^6$ in the slot $d^4$ so that the bolt $c$ cannot be retracted by manipulating said knob. However, if one turns the knob $e^2$ it will turn the sleeve $j$ by means of the lug $j^7$ engaging in the slot $e^4$ and this will act through the cam teeth $j^3$ $j^4$ to press the sleeve $j^2$ toward the right, as shown in the figures, thus disengaging the lug $j^6$ from the slot $d^4$ and then by a continued rotation of the knob $e^2$ the spindle $f$ may be turned and the bolt $c$ retracted to disengage it from the jamb. Thus the door is locked upon one side but may be opened from the other side. The parts are shown in this position in Fig. 15.

Figure 16:
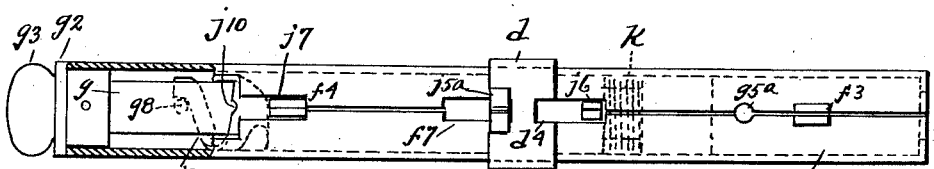
Fig. 16 is a view similar to Fig. 15, the parts being shown in still another position.

If now the rod $g$ is returned to its initial position and then turned in the opposite direction, that is, to the right to a position indicated in Fig. 18, the lug $g^8$ will travel along the cam surface $j^8$ to the position shown in Fig. 16 and the sleeves $j$ $j^2$ will be forced to their extreme longitudinal travel toward the right in the position shown in Fig. 16 so that the lug $j^5$ engages in the slot $j^3$ and the spindle $f$ is locked from turning so that it cannot be operated by either knob. In this position of the parts the enlarged outer end of the lug $j^5$ engages over the end of the yoke $d$ so that the bolt $c$ cannot be forced backward.

$h$ is the usual pin-lock cylinder. This is located in the end of the spindle $f$ and has the usual pin engagements that may be operated by a key inserted in the central slot of said cylinder and engaging in the slots $h^2$ of the ferrule $g^4$ to turn the rod $g$ to lock or unlock the parts from the side of the door upon which the knob $e$ is located.

In manufacturing the above described device I make most of the parts of sheet metal and the spindle $f$ is divided into two parts thus securing cheapness of construction and adaptability and convenience in assembling.

The yoke or frame $d$ is made of a single strip of sheet metal which is stamped into form with the bayonet catches $d^2$ formed in its edges and the locking notches $d^3$ $d^4$ also formed in their proper position in its edges and at its ends the apertures $d^6$ are formed. This strip is then bent up in the form illustrated in Fig. 9, the ends bending over each other as at $d^5$ with the apertures registering. The bayonet catches $d^2$ $d^2$ come opposite each other and locking notches $d^3$ $d^4$ come at the bend of the strip. The end of the shank $c^2$ of the bolt $c$ is then passed through the apertures $d^6$ in the ends of the strip where they overlap at $d^5$ (Fig. 9) and a cotter pin $d^7$ is inserted to hold the yoke and the bolt $c$ together.

The spindle $f$ is made in two parts. These parts meet at their inner ends at $f^8$. The meeting edges are adapted to engage each other as shown in Fig. 10, the projecting portion $f^9$ of one part fitting into a cut-away portion $f^{9a}$ in the other part, as shown in Fig. 10. The rod $g$ serves to hold the two parts of the spindle together. The engaging lug or wing $f^{10}$ is also struck out of the blank as shown in Fig. 11 which shows the blanks from which the cylindrical parts are turned. The part $f^{10}$ is stamped out in the form shown and is then bent at right angles to form the engaging lug or wing. The lug $f^3$ is also formed in the blank and turned upward as shown in Figs. 7 and 10. The outer end of one of the parts is turned inward to form a circular flange $f^2$ to retain the locking barrel in position.

Figure 2:
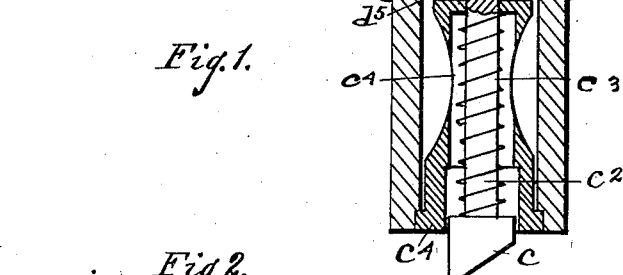
Fig. 2 is a detail illustrating the construction of one of the parts.
Figures 3, 4:
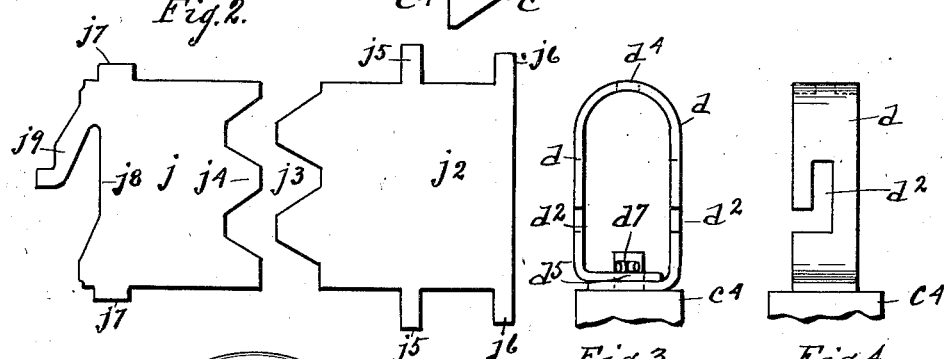
Figs. 3 and 4 are detail elevations of the yoke.
Figures 5, 6:
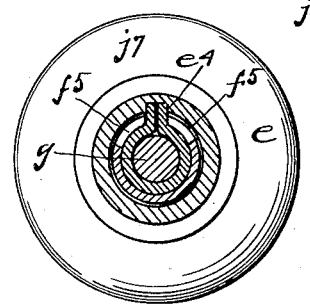
Fig. 5 is a section on the line 5—5 Fig. 1.
Fig. 6 is a section on the line 6—6 Fig. 1.

The blanks from which the cylindrical sleeves $j$ and $j^2$ are formed are shown in Fig. 2. These are stamped out with the projecting ears shown which are adapted to be turned outward when the blank is bent into a cylindrical form so as to form the lugs $j^5$ $j^6$ $j^7$ and the extending portion $j^9$ is bent as shown in Figs. 12 and 13 so as to form an extension of a cam surface $j^8$ and a surface for positioning the lug $g^8$ in one position above described.

The ferrule $g^4$ is placed in position against the end of the barrel $h$ and the sleeve $g^6$ is placed in position against the end of the ferrule $g^4$. The sleeves $j$ and $j^2$ are then placed upon the rod $g$ in the place shown and the spring $k$ is placed around the end of said rod in the relative position shown in the drawings. A pin $g^7$ of the shape shown, is then passed through an aperture $g^{7a}$ formed for that purpose through the wall of the spindle $f$ and engages in an aperture in the wall of said sleeve, the smaller portion of said pin engaging in a corresponding aperture in the wall of the spindle $f$. The rod $g$ is then inserted through the sleeve $g^6$ and into the ferrule $g^4$ and the pin $g^5$ is passed through the aperture $g^{5a}$ in the wall of the spindle $f$ and secures said ferrule on the end of the rod $g$. Said rod engages the inner end of the pin $g^7$ and prevents it disengaging from the aperture in the wall of the spindle.

The spindle $f$ being divided in two parts the lugs $j^5$ $j^6$ and $j^7$ may be inserted into their respective slots in the wall of said spindle as these slots open to the ends of their respective parts of the spindle.

What I claim is:

1. In an apparatus of the kind described, a reciprocating engaging bolt, a spindle adapted to actuate said bolt, a reciprocating part adapted to lock said bolt at each end of the travel of said part, and means for reciprocating said locking part.

2. In an apparatus of the kind described, a bolt, a spindle extending transversely past said bolt and adapted to rotate to actuate the same, a part connected to said spindle and adapted to reciprocate in the direction of the length of the same and to engage said bolt at each end of its travel to lock said spindle from rotation, and means for reciprocating said locking part.

3. In an apparatus of the kind described, a bolt, a yoke secured to said bolt, a spindle extending through said yoke and adapted to rotate to actuate the same, said yoke being provided with notches in its edges, a reciprocating part connected to said spindle and adapted to engage in one of said notches at one end of its travel and in the other of said notches at the other end of its travel to lock said spindle from rotation, and means for actuating said reciprocating part.

4. In an apparatus of the kind described, the combination of a bolt, a hollow spindle extending transversely past said bolt and adapted to rotate to actuate the same and provided with a slot through its wall, a part adapted to reciprocate in said spindle and extending through said slot and adapted to engage said bolt at each end of its travel to lock said spindle from rotation, and means for actuating said reciprocating part.

5. In an apparatus of the kind described, a bolt, a hollow spindle extending transversely past said bolt and having a slot through its wall adjacent to said bolt, a part adapted to reciprocate in said spindle, said bolt being provided with notches in its opposite edges, a lug extending from said reciprocating part through said slot upon one side of said bolt, a lug extending from said reciprocating part through said slot upon the other side of said bolt, and means for actuating said reciprocating part to engage one or the other of said lugs in a notch to lock said spindle from rotation.

6. In an apparatus of the kind described, a bolt, a hollow spindle extending transversely past said bolt, a rotatable rod bearing in said spindle and extending longitudinally thereof, a sleeve upon said rod, said spindle being provided with a slot through its wall adjacent to said bolt, said sleeve being provided with a lug extending through said slot adjacent to said bolt, said sleeve being adapted to reciprocate longitudinally of said rod and spindle, and engage said bolt at each end of its travel, said sleeve being provided with a cam surface extending around the periphery of said rod, a pin projecting from the periphery of said rod and engaging said cam surface to reciprocate said sleeve.

7. In an apparatus of the kind described, a bolt, a yoke connected to said bolt, a hollow spindle extending through said yoke, a rod bearing and adapted to turn in said spindle and extending longitudinally thereof, said spindle being provided with a slot adjacent to said yoke, a sleeve extending through said yoke and being adapted to engage the same at each end of its travel and to be free from said yoke at its intermediate position, said sleeve being provided with a cam surface extending around said rod, said rod being provided with a pin adapted to engage said cam surface, said pin and cam surface being so formed and relatively located that the sleeve shall be at the ends of its travel when said pin is at the outer and inner portion of said cam surface.

8. In an apparatus of the kind described, a bolt, a yoke secured to said bolt, a hollow spindle extending through said yoke, a rod bearing and adapted to turn in said spindle, said spindle being provided with a longitudinal slot adjacent to said yoke, a sleeve upon said rod projecting through said yoke, said sleeve being adapted to reciprocate and to engage said yoke at the extreme of its travel, a second sleeve on said spindle, a cam surface, said cam surface engaging a cam surface on the first named sleeve, a second cam surface on the second sleeve, a pin on said rod adapted to engage said second cam surface to reciprocate said sleeve, a second slot through the wall of said spindle having intermediate lateral extensions, a lug projecting from said second sleeve through said second slot, a knob adapted to rotate around said spindle and having a groove engaging the lug on said second sleeve so as to prevent relative angular motion, the parts being so arranged that the lug on the second sleeve shall be in the intermediate enlarged portion of the second slot of the spindle wall when said second sleeve is engaged with the yoke at the portion of the travel of said sleeve toward said knob substantially as and for the purpose described.

9. In an apparatus of the kind described, the combination of a bolt, a yoke secured to said bolt, a hollow spindle extending through said yoke and having a slot adjacent to said yoke, a rod extending longitudinally within said spindle and adapted to rotate therein, a sleeve upon said rod extending through said yoke and adapted to reciprocate and to engage said yoke at each end of its travel, a second sleeve on said rod having a cam surface adapted to actuate the first named sleeve, said spindle being provided with a second slot through its wall having an enlarged intermediate portion, a lug extending from said second sleeve through said second slot, a knob surrounding said spindle, a longitudinally extending slot in the inner wall of said knob adapted to engage the lug from said second sleeve, the lug from said second sleeve being adapted to reciprocate in the slot in said knob and to bind said knob to said spindle when in the end portions of said slot and to permit relative angular movement between said knob and spindle when in the enlarged intermediate portion, a second cam surface on said second sleeve surrounding said rod, a lug upon said rod adapted to engage said second surface to reciprocate said sleeves.

10. In an apparatus of the kind described, a hollow cylindrical spindle having the edges at one end bent inward to form an engaging flange and operative parts within said spindle, held in place by said flange.

11. In an apparatus of the kind described, a hollow cylindrical spindle divided transversely between its ends into two parts, and operative parts engaging within said spindle.

12. In an apparatus of the kind described, a hollow cylindrical spindle divided transversely between its ends into two parts, and operative parts engaging within said spindle, slots through the wall of said spindle opening to the ends of the constituent parts of the spindle, operative parts being provided with lugs extending through said slots.

13. The yoke d formed of a single strip having lateral slots and having its ends bent and overlapping each other and engaging apertures in said overlapped ends for the purpose described.

14. In an apparatus of the kind described, having a hollow cylindrical spindle and a rotatable rod bearing therein, a locking cylinder in said spindle, a cylindrical ferrule having its ends adjacent to said locking cylinder and having slots in its edge adjacent to said cylinder, and a pin engaging said ferrule upon the end of said rod, a sleeve passing over said rod, its edge at one end engaging against the edge of said ferrule, and means for engaging said sleeve with the spindle for the purpose described.

In testimony whereof I sign this specification.

LOUIS HUFFMAN.